United States Patent [19]

Van Dick

[11] Patent Number: 4,922,366

[45] Date of Patent: May 1, 1990

[54] MELTABLE CONDUCTOR TO BE USED IN SERIES WITH VOLTAGE SUPPRESSORS

[75] Inventor: Robert C. Van Dick, Aloha, Oreg.

[73] Assignee: Transnational Energy Systems, Inc., dba TESCO, Wilsonville, Oreg.

[21] Appl. No.: 193,040

[22] Filed: May 12, 1988

[51] Int. Cl.$^5$ .............................................. H02H 3/20
[52] U.S. Cl. ...................................... 361/56; 361/91; 361/104; 361/111; 337/290
[58] Field of Search ...................... 361/18, 39, 41, 54, 361/56, 86, 91, 103, 104, 111, 124, 126; 337/15, 17, 31, 32, 290; 357/67

[56] References Cited

U.S. PATENT DOCUMENTS

| | | | |
|---|---|---|---|
| 3,651,378 | 3/1972 | McWilliams | 361/91 |
| 3,878,497 | 4/1975 | Spangler | 337/295 |
| 3,879,696 | 4/1975 | Imajyo et al. | 337/244 |
| 3,883,838 | 5/1975 | Bogert et al. | 337/295 |
| 4,023,071 | 5/1977 | Fussell | 361/91 |
| 4,089,032 | 5/1978 | Dell Orfano | 361/56 |
| 4,288,833 | 9/1981 | Howell | 361/124 |
| 4,355,082 | 10/1982 | Bischoff et al. | 428/607 |
| 4,531,806 | 7/1985 | Hsieh | 337/290 X |
| 4,587,588 | 5/1986 | Goldstein | 361/54 |
| 4,616,286 | 10/1986 | Breece | 361/56 |
| 4,635,091 | 1/1987 | Roger | 357/67 |
| 4,698,736 | 10/1987 | Higa | 363/51 |
| 4,700,259 | 10/1987 | Stokes | 361/103 |
| 4,740,859 | 4/1988 | Little | 361/56 |

Primary Examiner—A. D. Pellinen
Assistant Examiner—David Osborn
Attorney, Agent, or Firm—Cushman, Darby & Cushman

[57] ABSTRACT

An electrically conductive meltable conductor that is used in series with a voltage surge protector in AC power lines is disclosed. The meltable conductor must be able to keep a substantially constant resistance when subject to transient high voltage surges and momentary line overvoltages of twice the rated line voltage for periods of one full cycle. The meltable conductor must also actually melt within a few seconds after steady state line voltage is applied. Such a conductor has a resistance between 0.8 milliohms and 14 milliohms. This conductor allows detection of a short circuit breakdown condition in a voltage surge suppressor without substantially decreasing the life-span of the voltage surge suppressor.

17 Claims, 2 Drawing Sheets

MELTABLE CONDUCTOR TO BE USED IN SERIES WITH VOLTAGE SUPPRESSORS

BACKGROUND OF THE INVENTION

1. Field of the Art

This invention relates to a device which detects breakdown in AC voltage surge suppressors, and, more particularly, to a meltable, electrical conductor used in series with voltage surge suppressors that suppress voltage surges occurring in power lines of 120, 240 or 480 volts, for example, that operate at 50 Hz, 60 Hz, 400 Hz or some other frequency. That electrical conductor can also be employed to monitor surge current levels and waveforms.

2. Background of the Prior Art

It is well known that voltage surges occur across power lines. Unless these surges are suppressed, they can cause great damage to electrical equipment.

Known AC voltage surge suppressors will clamp voltage surges at a clamping voltage that is characteristic of the voltage surge suppressor. For example, metal oxide varistors can protect against very large voltage surges which occur in power lines.

However, voltage surge suppressors eventually break down, entering a short circuit condition, and are not able to clamp any further voltage surges. Therefore, it is also known to place a fuse in series with a voltage surge suppressor. When breakdown of the voltage surge suppressor occurs, the resulting short circuit condition causes the fuse to blow. This provides an indication that the voltage surge suppressor can no longer give voltage surge protection. This type of arrangement is disclosed in both Fussell, U.S. Pat. No. 4,023,071, and Dell Orfano, U.S. Pat. No. 4,089,032.

However, most fuses, when used in this type of application, considerably shorten the life-span of the voltage surge suppressor. Therefore, although fuses provide an indication that the voltage surge suppressor is no longer capable of voltage surge suppression, most of them do this at the expense of the voltage surge suppressor's life-span.

Also, most fuses cannot withstand repeated surge voltages. Therefore, most fuses will not last very long and need to be frequently replaced even before breakdown of the voltage surge suppressor.

It has not been previously known which fuses shorten surge suppressor life-span or can withstand repeated surge voltages. Because of this, no device has been known which can effectively detect breakdown of voltage surge suppressors.

SUMMARY OF THE INVENTION

In view of the above, it is an object of the present invention to provide a meltable, electrical conductor that can detect when a voltage surge suppressor is no longer capable of voltage surge suppression without substantially decreasing the life-span of the voltage surge suppressor.

It is another object of the present invention to provide a meltable conductor which can perform the above object when used with different types and sizes of voltage surge suppressors.

It is a further object of the present invention to provide a meltable wire link which can withstand surge environments specified in IEEE standard 587-1980 and also momentary line overvoltages of twice the rated power line voltage for a full cycle.

It is a further object of the present invention to provide a meltable conductor which can be easily replaced after its useful lifetime is over.

It is a still further object that the meltable conductor can also be used to monitor surge current levels and waveforms.

The present invention meets the above objects by providing a conductor that will melt within a few seconds after steady state power conditions are applied across its terminals. Therefore, when a voltage surge suppressor enters a short circuit condition, the steady state power condition across the conductor causes the conductor to melt within a few seconds and indicates a break down of the voltage suppressor. The defective voltage surge suppressor can then be detected and replaced.

The meltable conductor is chosen so that the surge voltages and momentary line overvoltages can be withstood, thereby ensuring that it will properly melt when subjected to steady state conditions and also last a long time.

One specific embodiment provides a copper wire link having a known resistance. The resistance is chosen so that it will melt within a few seconds after a steady state power line voltage is applied, will not substantially increase in resistance if subjected to repeated voltage surges and momentary line overvoltages and will not substantially shorten the lifetime of the surge suppression device used in series with it.

BRIEF DESCRIPTION OF THE DRAWINGS

These and other advantages of the present invention may be appreciated from studying the following detailed description of the presently preferred embodiment together with the drawings in which.

DETAILED DESCRIPTION OF THE PREFERRED EMBODIMENT

Figure 1:
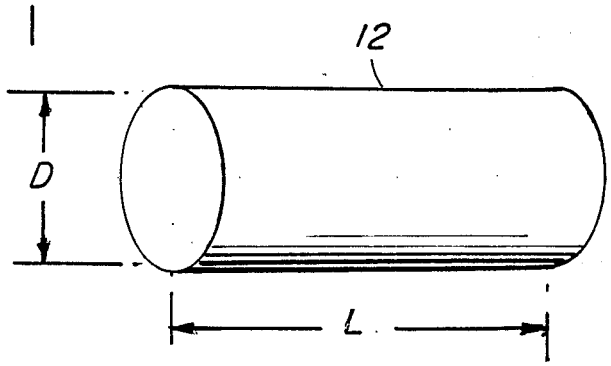
FIG. 1 illustrates a perspective view of one embodiment of the meltable conductor of the present invention.

The present invention can be used with all types of voltage surge suppressors. The preferred embodiment of the invention uses the meltable conductor in series with a Siemens metal oxide varistor.

The level at which a varistor can clamp surge voltages depends on the specific device. For example, metal oxide varistors have different clamping characteristics than silicon carbide varistors. However, one important characteristic for all varistors are the dimensions of the varistor conductor. Associated with these dimensions, and also the conductor characteristics, is a distributed capacitance. Varistors can have capacitances that range at least from 85-37,000 picofarads. For a varistor that must be able to clamp a voltage surge at a predetermined level, the capacitance of the varistor cannot be easily changed because it is an inherent characteristic related to the clamping voltage and the power dissipation capability of the varistor.

When any resistance is placed in series with the varistor (or other type of voltage surge suppressor), this resistance and the distributed capacitance of the voltage surge suppressor form an RC circuit. As with all RC circuits, the voltage across the varistor lags the current. The amount of the lag is dependent on the RC time constant. In real use situations, because the capacitance cannot be easily changed, the greater the series resistance, the greater the voltage lag.

A greater voltage lag causes the varistor to dissipate more power due to the greater time it takes the varistor to reach its clamping voltage level. Therefore, the varistor must dissipate more power as thermal energy, which, in turn, decreases the life-span of the varistor.

Although the life-span of the varistor would be maximized if no resistance were to exist in series with the varistor, some resistance is necessary to detect breakdown of the varistor. The present inventor has determined that the use of a meltable conductor having a resistance of at least 0.8 milliohms will readily enable the detection of breakdown in a varistor.

However, all meltable conductors having a resistance greater than 0.8 milliohms will not function properly in surge protection environments. The proper resistance for the meltable conductor is influenced by the following factors: the worst case surge voltages, the momentary line overvoltages to which it will be subjected, the type of varistor (or other type of voltage surge suppressor) it will be used in series with, and the value of the steady state line voltage. Each of these factors will now be described more fully.

The resistance of the meltable conductor must be chosen so that it melts within one or two seconds after a steady state line voltage is applied, for safety considerations. This steady state line voltage will be applied when breakdown of the varistor occurs and the varistor enters a short circuit condition.

If the resistance of the meltable conductor is too low, melting will not occur, and, if it is too high, melting may inappropriately occur during surge voltage conditions or during momentary line overvoltage situations.

The resistance of the meltable conductor must also have a value which stays constant even after being subjected to repeated worst case voltage surges. If the resistance of the meltable conductor increases due to surge voltages, it will significantly decrease the life-span of the surge suppressor.

Similarly, the resistance of the meltable conductor must stay constant for repeated momentary line overvoltage conditions that can be two times the steady state voltage for period of one full cycle. These momentary line overvoltages are due to power switching operations and other power line imbalances or disturbances.

The type of surge suppressor that the meltable conductor is used with is another factor that must be considered when determining the resistance of the meltable conductor. As stated previously, greater resistance will cause a greater voltage lag. However, the distributed capacitance of the surge suppressor is also a factor: the lower the capacitance, the less the voltage will lag the current given the same resistance. Typically, voltage surge suppressors which have a higher clamping voltage have a lower capacitance. Therefore, a voltage surge suppressor having a lower capacitance will be effected less by resistance than a voltage surge suppressor having a higher capacitance. For example, a Siemens metal oxide varistor that has a 150 vrms rating has a capacitance of 1400 pf, but a Siemens metal oxide varistor that has a 130 vrms rating has a capacitance of 1800 pf.

An example of a meltable conductor which operates properly when used in series with a metal oxide varistor having a 150 vrms voltage rating on a 120 VAC single phase power line voltage with a short circuit current capacity of 15 A is a No. 26 gauge copper wire that is one-quarter inch to one inch long. This gives a resistance of about 2 to 8 milliohms. This copper wire will melt within two seconds after the steady state line voltage is applied and will not substantially increase in resistance if subjected to repeated unipolar surge voltages of 6 KV lasting 50 $\mu$s with a 1.2 $\mu$s rise time that produce discharge short circuit surge currents of 3000 amperes lasting 20 $\mu$s with an 8 $\mu$s rise time, or two times momentary line overvoltages ($\pm$10%, therefore 264 vrms) having a duration of one full cycle. This copper wire will overheat and increase in resistance if subjected to a two times momentary line overvoltage having a duration of two full cycles.

Another example of a copper wire that meets the above requirements is a No. 28 gauge copper wire having a length of 1.9 inches and a resistance of 13.1 milliohms. However, although resistances of copper greater than 14 milliohms may satisfy the above criteria, the larger resistance then tends to begin to shorten the life-span of the varistor considerably.

It has been determined that a No. 24 gauge copper wire does not melt fast enough and the voltage surge suppressor, after entering its short circuit condition, absorbs too much energy and burns totally until it is electrically an open circuit. A No. 30 gauge copper wire melts too fast and will melt with surge currents approaching 3000 A. However, copper wires between No. 24 gauge and No. 30 gauge can perform as required.

FIG. 1 illustrates the general characteristics of a meltable conductor 12. As shown in FIG. 1, meltable conductor 12 has a certain diameter D and a length L, which vary depending upon the operating conditions that the conductor will be exposed to and the conductor material composition of the meltable conductor.

The meltable conductor is preferably copper, but other conductors can be used as long as they have the appropriate resistance values and melting characteristics as described hereinafter. For example, wires made of aluminum, gold, silver, and other conductive elements such as alloys having low resistances can be used.

Figure 2:
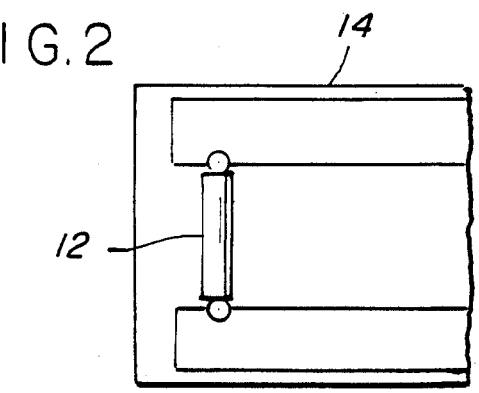
FIG. 2 illustrates a top view of the embodiment of the meltable conductor shown in FIG. 1 mounted to a printed circuit board.

Meltable conductor 12 need not be circular but can be rectangular or some other cross sectional configuration and, as shown in FIG. 2, can also be formed on a printed circuit board 14 for easy replacement. Meltable conductor 12 can also be formed as a controlled copper trace on or in a printed circuit board. Also, the term "meltable conductor" is intended to include any conductive component, whether that component be called a wire, fuse, resistor, inductor, or the like.

As stated previously, most AC fuses cannot satisfy the above criteria: i.e., keep a substantially constant resistance during both unipolar surges of 6 KV lasting 50 $\mu$s that produce discharge surge currents of 3000 A lasting 20 μs and also two times momentary line overvoltages for one full cycle for a 120 V AC power line and also melt fast when the steady state line voltage is applied. One reason for this is that most AC fuses are made of alloys which have a higher resistivity than copper or other similar conductors. Many tests have been conducted using different types of fuses to determine if any had characteristics, such as resistance, which would meet the above criteria. It was determined that fuses having a resistance between 0.8 and 14 milliohms is preferable. However, because of the many different types of packaging, alloys used in construction, and blow characteristics, no other one characteristic is predominant.

Using Underwriters Laboratories listed fuses by Littlefuse, 113 fuse types were examined and only three fuse types survived all three criteria. These were: a 10 amp, fast blow, glass body fuse of 10.4 milliohms, number 312-010; a 12 amp, fast blow, ceramic body fuse of 9.7 milliohms, number 314-012; and a 15 amp, fast blow, ceramic body fuse of 6.4 milliohms, number 314-015.

If discharge unipolar surge currents of 10,000 A lasting 20 μs must pass through the meltable conductor, it is believed that the above recited fuses which satisfied the criteria with 3000 A discharge surge currents will not be able to withstand the increased discharge surge currents and will not function properly. The copper wire links having gauges between No. 24 and No. 30, such as previously discussed, and other meltable wire links, will be able to withstand these higher discharge surge currents. Even larger discharge surge currents can be withstood by the copper wire link (or other type of meltable conductor) by using a smaller resistance value. However, the greater the resistivity of the conductor, the greater the chance that the conductor will not survive the repeated surge voltages and momentary line overvoltages. For example, a No. 26 gauge copper wire link that is one half inch long (and has a resistance of about 4 milliohms) can withstand 20 μs current surges of 40,000 A.

When deciding between the use of either a fuse or other type of meltable conductor, such as the copper wire link described above that does not contain the packaging and other expensive conductors, the copper wire link (or other meltable wire link) has a great cost advantage over a meltable conductor such as a fuse. A meltable wire link can be manufactured for only a fraction of a cent, while the fuses which meet the same criteria can cost at least 100 times as much.

Figure 3:
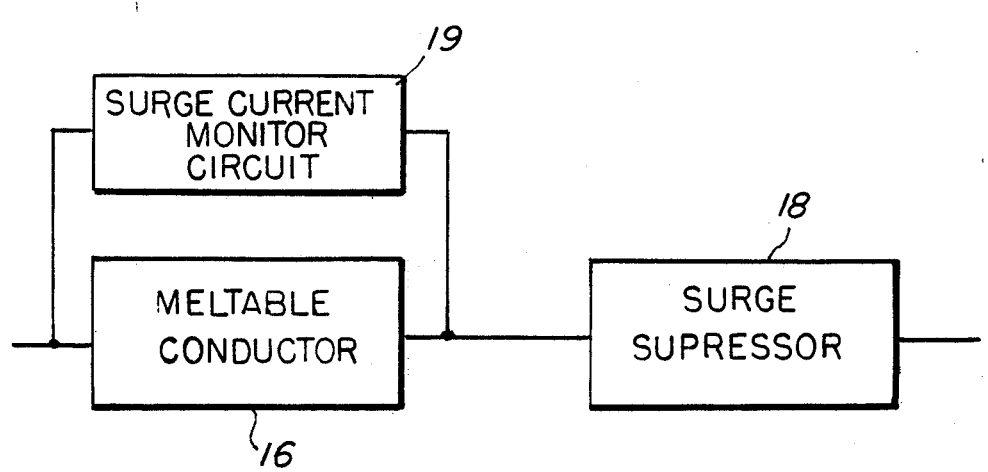
FIG. 3 illustrates a block diagram of a series surge protection circuit using the meltable conductor of the present invention and the attachment of a monitor circuit that allows the measurement of surge current levels and waveforms.

FIG. 3 shows that meltable conductor 16 is used in series with some type of voltage surge suppressor 18 or combination of different types of surge suppressors. In the preferred embodiment ideally a Siemens metal oxide varistor is used, but another type of varistor, a silicon avalanche surge suppressor, a gas tube voltage surge suppressor, other type of semiconductor voltage surge suppressor, or the like could be used. This series combination can then be used with a power line for voltage surge suppression.

FIG. 3 also shows a surge current monitor circuit 19 connected in parallel with meltable conductor 16. The resistance of meltable conductor 16 is known and the voltage that develops across meltable conductor 16 can be sensed and used to determine the associated surge current magnitude and waveform.

Figure 4:
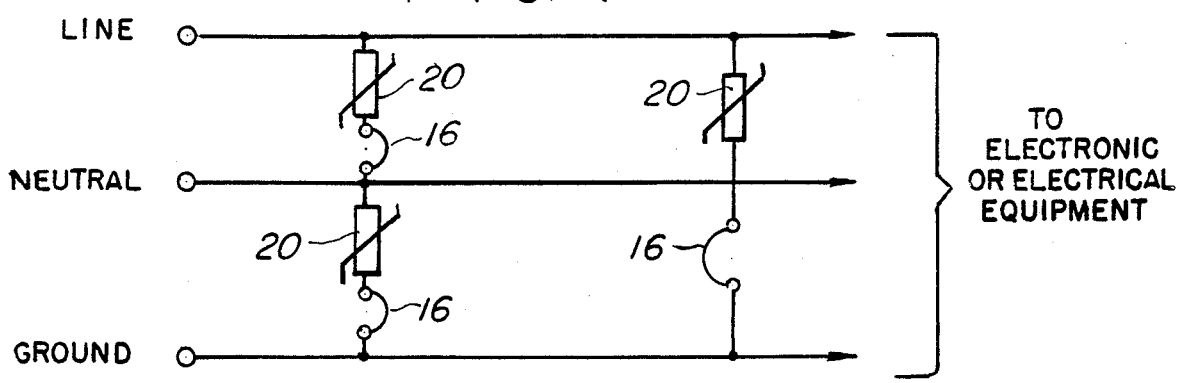
FIG. 4 illustrates the use of the meltable conductor in a single phase, AC power line.
Figure 5:
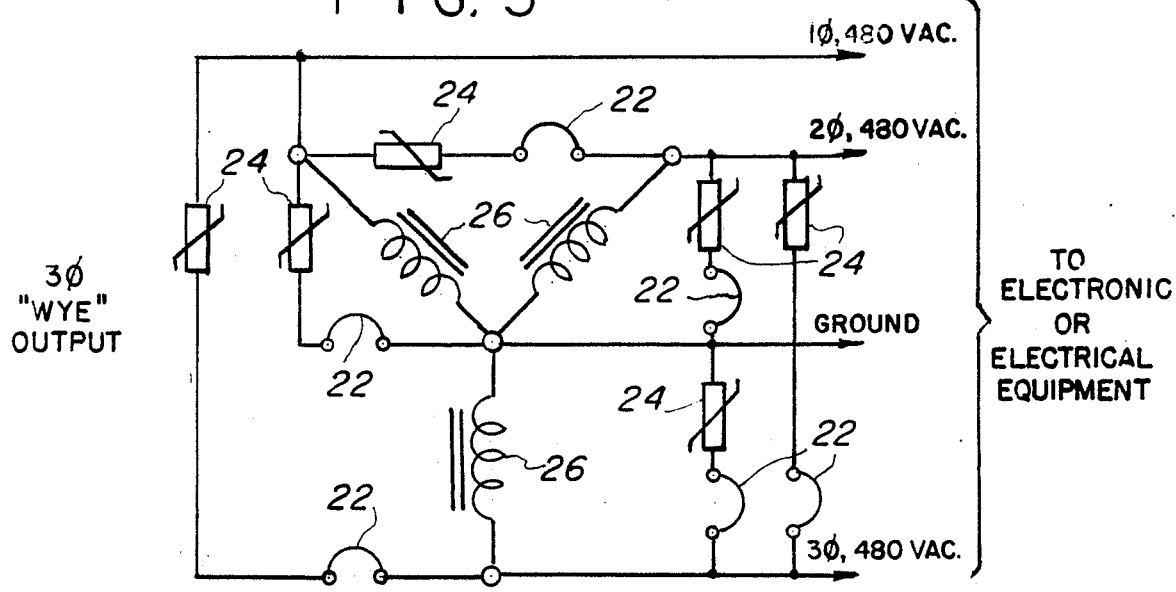
FIG. 5 illustrates the use of the meltable conductor in a three phase, AC power line.
Figure 6:
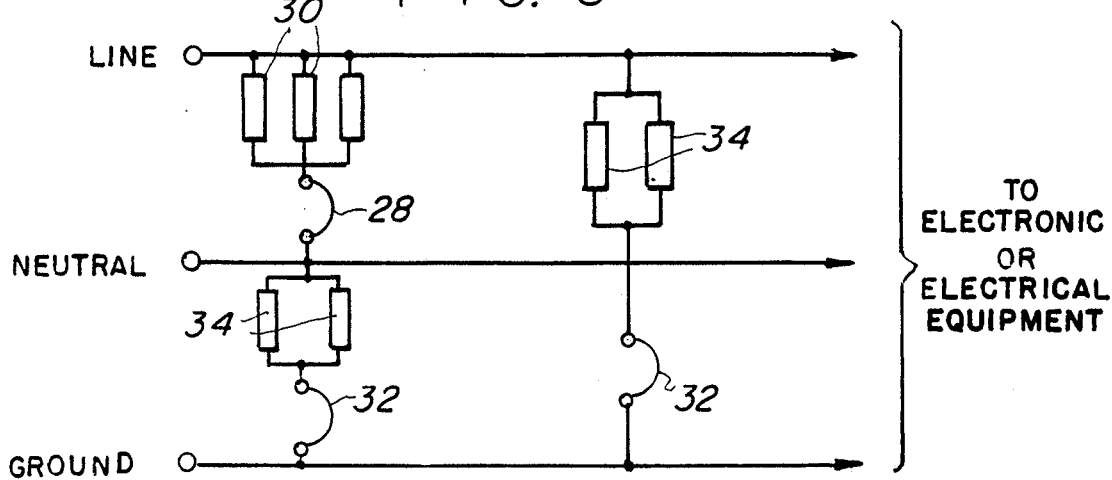
FIG. 6 illustrates the use of the meltable conductor in series with different parallel arrangements of surge suppressors.

FIGS. 4-6 show the present invention being used in different types of circuit configurations. These configurations are exemplary only.

FIG. 4 illustrates a 120 V, single phase, AC power line having a short circuit current of 15 with voltage surge protection consisting of a plurality of meltable conductors 16 in series with metal oxide varistors 20. The series combinations of metal oxide varistor 20 and meltable conductor 16 between line and neutral, line and ground, and neutral and ground provide complete surge protection. Each metal oxide varistor 20 is a Siemens S20K150 metal oxide varistor capable of clamping unipolar surge voltages of 6 KV at a clamping voltage of 550 V and withstanding discharge surge currents of 3000 A. Each meltable conductor 16 is capable of conducting 3000 amperes without a substantial increase in resistance or other adverse effect. Meltable conductor 16 can be, for example, the previously discussed No. 26 gauge copper wire that is one-quarter to one inch long.

FIG. 5 illustrates a 480 volt, three phase, AC power line having a short circuit current of 260 A using a WYE connection and having a plurality of meltable conductors 22 and varistors 24 that provide voltage surge protection. Each series combination of varistor 24 and meltable conductor 22 is connected between each phase and between each phase and ground in parallel with inductors 26. Each varistor 24 is a Siemens B60K550 metal oxide varistor capable of clamping unipolar surge voltages of 6 KV at a clamping level of 1700 V if the discharge surge current is 3000 A and clamping unipolar surge voltages of 10 KV at a clamping level of 2000 V when the discharge surge current is 10,000 A. Meltable conductors 22 must be able to withstand 10,000 A surge currents. Meltable conductors 22 can be the same as meltable conductor 16 shown in FIG. 4, but resistances of one-half that of meltable conductor 16 are preferable. This is because of the larger short circuit current available from a 480 V, three phase, AC power line.

FIG. 6 illustrates that different parallel combinations of voltage surge suppressors can be used in series with the meltable conductor of the present invention. As shown, the parallel combination consisting of varistors 30, which are Siemens S20K150 metal oxide varistors, gives unipolar voltage surge protection of 6 KV and can withstand surge currents of 9000 A. The parallel combinations consisting of varistors 34 give unipolar voltage surge protection of 6 KV and can withstand 6000 A. Meltable conductor 32 has proper resistance and dimension characteristics to handle these surges. A meltable conductor such as meltable conductor 22 shown in FIG. 5 is adequate.

While the invention has been described in connection with what is presently considered to be the most practical and preferred embodiments, it is to be understood that the invention is not limited to the disclosed embodiment, but, on the contrary, is intended to cover various modifications and equivalent arrangements included within the spirit and scope of the appended claims.

For example, in FIG. 4, varistor 20 between line and ground can be attached to meltable conductor 16 between neutral and ground. Therefore, varistor 20 attached between line and ground and varistor 20 attached between neutral and ground share a common, single, meltable conductor 16. Only two meltable conductors 16 rather than the three meltable conductors 16 illustrated in FIG. 4 are then necessary. Also, different parallel and/or series combinations of meltable conductors can be used to obtain a meltable conductor having the characteristics necessary for any particular application.

Therefore, persons of ordinary skill in this field are to understand that all such equivalent structures are to be included within the scope of the following claims.

What is claimed is:

1. A circuit device to be used with an AC power line having a steady state line voltage comprising:
   a voltage surge suppressor; and
   a wire link in series with said voltage surge suppressor for detecting a short circuit condition resulting from breakdown of said voltage surge suppressor, said wire link having a length not greater than two inches, having a resistance between 0.8 milliohms and 14 milliohms, dose not substantially reduce the life-span of said voltage surge suppressor, and can also withstand repeated transient surge conditions, two times momentary line overvoltage condition lasting one full cycle and will also melt when subjected to said steady state line voltages applied for greater than a predetermined time.

2. A circuit device according to claim 1 wherein said wire link is made of copper.

3. A circuit device according to claim 1 wherein said wire link is made of an alloy.

4. A circuit device according to claim 1 wherein said wire link will melt within 2 seconds after said steady state line voltage is applied.

5. A circuit device according to claim 1 wherein said wire link will melt when a steady state line voltage of 120, 240 or 480 VAC that has a frequency of 50 Hz, 60 Hz or 400 Hz is applied to said conductor for greater than said predetermined time.

6. A circuit device according to claim 1 wherein said wire link can withstand said repeated transient surge conditions that have unipolar 6 KV transients lasting 50 μs that produce discharge surge currents of 3000 A lasting 20 μs.

7. A circuit device according to claim 1 wherein said wire link can withstand said repeated transient surge conditions that have unipolar 10 KV transients lasting 50 μs that produce discharge surge currents of 10,000 A lasting 20 μs.

8. A circuit device according to claim 1 further including monitor means connected to said conductor for monitoring said surge conditions.

9. A circuit device to be used with an AC power line having a steady state line voltage comprising:
   a voltage surge suppressor; and
   a copper wire in series with said voltage surge suppressor for detecting a short circuit condition resulting from breakdown of said voltage surge suppressor by melting when subjected to said steady state line voltage for greater than a predetermined time, said copper wire is between No. 24 gauge and No. 30 gauge copper wire, has a length not greater than 2 inches, and has a low resistance that does not substantially reduce the life-span of said voltage surge suppressor.

10. A circuit device according to claim 9 wherein said length of said copper wire is between one-quarter inch and one inch.

11. A circuit device according to claim 9 wherein said copper wire will melt within 2 seconds after said steady state line voltage is applied.

12. A circuit device according to claim 9 wherein said copper wire will melt when a steady state line voltage of 120, 240 or 480 VAC that has a frequency of 50 Hz, 60 Hz or 400 Hz is applied to said copper wire for greater than said predetermined time.

13. A circuit device according to claim 9 wherein said copper wire can withstand repeated unipolar 6 KV transients lasting 50 μs that produce a discharge surge current of 3000 A lasting 20 μs.

14. A circuit device according to claim 9 wherein said copper wire can withstand repeated unipolar 10 KV transients lasting 50 μs that produce a discharge surge current of 10,000 A lasting 20 μs.

15. A circuit device according to claim 9 wherein said copper wire can withstand repeated two times momentary line overvoltages for one full cycle.

16. A circuit device according to claim 15 wherein said copper wire can withstand repeated two times momentary line overvoltages for one full cycle when said steady state line voltage is 120, 240 or 480 VAC and has a frequency of 50 Hz or 400 Hz.

17. A circuit device according to claim 9 further including monitor means connected to said copper wire for monitoring said surge conditions.

* * * * *